US012795234B2

(12) United States Patent
Sakurabu

(10) Patent No.: US 12,795,234 B2
(45) Date of Patent: Nov. 10, 2026

(54) FOCUS CONTROL DEVICE, IMAGING APPARATUS, FOCUS CONTROL METHOD, AND PROGRAM

(71) Applicant: FUJIFILM Corporation, Tokyo (JP)

(72) Inventor: Hitoshi Sakurabu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 274 days.

(21) Appl. No.: 18/632,210

(22) Filed: Apr. 10, 2024

(65) Prior Publication Data

US 2024/0380973 A1 Nov. 14, 2024

(30) Foreign Application Priority Data

May 12, 2023 (JP) ................................ 2023-079640

(51) Int. Cl.
*H04N 23/67* (2023.01)

(52) U.S. Cl.
CPC ......... *H04N 23/675* (2023.01); *H04N 23/672* (2023.01)

(58) Field of Classification Search
CPC .................................................... H04N 23/675
See application file for complete search history.

(56) References Cited

U.S. PATENT DOCUMENTS

2013/0307993 A1 11/2013 Kawarada
2018/0299645 A1* 10/2018 Kuribayashi ........ H04N 23/675
2022/0294991 A1 9/2022 Hoshino
2022/0353423 A1* 11/2022 Nishikawa ........... H04N 25/704

FOREIGN PATENT DOCUMENTS

JP 2013054256 3/2013
JP 2013242407 12/2013
JP 2022137760 9/2022
JP 2022170554 11/2022

* cited by examiner

*Primary Examiner* — Cynthia Calderon
(74) *Attorney, Agent, or Firm* — JCIPRNET

(57) ABSTRACT

The focus control device includes: a processor; and a memory. The processor is configured to: acquire an image signal output from an imaging element; set a focusing target region in an imaging region based on output information from an operating device that receives an operation by a user; determine a search region based on the focusing target region; detect an object region including a specific object from the search region; detect an overlapping region in which the focusing target region and the object region overlap each other; and perform focus control based on the image signal of the overlapping region.

18 Claims, 17 Drawing Sheets

FOCUS CONTROL DEVICE, IMAGING APPARATUS, FOCUS CONTROL METHOD, AND PROGRAM

CROSS-REFERENCE TO RELATED APPLICATIONS

The present application claims priority under 35 U.S.C. § 119 to Japanese Patent Application No. 2023-079640 filed on May 12, 2023. The above application is hereby expressly incorporated by reference, in its entirety, into the present application.

BACKGROUND

1. Technical Field

The technology of the present disclosure relates to a focus control device, an imaging apparatus, a focus control method, and a program.

2. Description of the Related Art

JP2022-170554A discloses a control method of an imaging apparatus including a signal generation unit that obtains an image signal from an imaging element which performs imaging through an imaging optical system, the method including: an arbitrary region setting step of setting an arbitrary region in the image signal; a focusing detection step of detecting a defocus amount from calculation regions obtained by dividing a region including the image signal outside the arbitrary region into a plurality of portions; a subject region specifying step of specifying a subject region in which a subject is present from the image signal; and a focusing region selection step of selecting a focusing region from the arbitrary region and the subject region.

JP2013-054256A discloses an imaging apparatus including an imaging unit, a phase difference detection unit, a subject detection unit, and a controller. The imaging unit includes an imaging pixel that is provided in a first region of the imaging region and generates an image of a subject by photoelectrically converting light from an imaging lens, and a focusing detection pixel that is provided in a second region of the imaging region narrower than the first region and receives light passing through a part of an exit pupil of the imaging lens. The phase difference detection unit detects a phase difference between two image signals based on a signal from the focusing detection pixel. The subject detection unit detects a first subject region of a subject based on a signal from the imaging unit. The controller performs focus control on a second object region that is different from the first subject region detected by the subject detection unit and is estimated as a part of the subject, by using a signal from the phase difference detection unit.

In JP2022-137760A, a defocus amount is detected in each AF area included in a plurality of AF areas, and a depth map is created by converting the defocus amount into a lens position corresponding to a distance in each of regions of a body range and an outer range. In a case where the depth map is obtained, a nearby region that has a size larger than an average by a predetermined value or higher within the body range is extracted as a cross-cutting candidate. There is disclosed a focusing adjustment device that determines a region corresponding to an unnecessary object based on the candidate and performs focusing adjustment control based on a distance value corresponding to a region obtained by excluding the region corresponding to the unnecessary object from a main object region.

JP2013-242407A discloses an imaging apparatus which performs display indicating that all focusing detection regions including a region of a specific subject are in focus in a case where the region of the specific subject is included in the focusing detection regions in which a focusing distance is within a depth of field of a determined focusing distance.

SUMMARY

An object of the technology of the present disclosure is to provide a focus control device, an imaging apparatus, a focus control method, and a program capable of performing focus control on an object that is intended by a user as a focusing target at high speed and with high accuracy.

In order to achieve the above object, according to the present disclosure, there is provided a focus control device comprising: a processor; and a memory, in which the processor is configured to: acquire an image signal output from an imaging element; set a focusing target region in an imaging region based on output information from an operating device that receives an operation by a user; determine a search region based on the focusing target region; detect an object region including a specific object from the search region; detect an overlapping region in which the focusing target region and the object region overlap each other; and perform focus control based on the image signal of the overlapping region.

Preferably, the focusing target region includes a plurality of blocks, and the processor is configured to detect one or a plurality of blocks that overlap the object region among the plurality of blocks, as the overlapping region.

Preferably, the processor is configured to detect one or a plurality of blocks at which an overlap ratio with the object region is equal to or higher than a threshold value among the plurality of blocks, as the overlapping region.

Preferably, the processor is configured to change the threshold value according to a type of the specific object.

Preferably, the processor is configured to detect a region in which an overlap ratio of the focusing target region and the object region is equal to or higher than a threshold value, as the overlapping region.

Preferably, the processor is configured to, in a case where the overlap ratio is lower than the threshold value, perform focus control based on the image signal of the focusing target region.

Preferably, the processor is configured to determine the search region based on a long side of the focusing target region.

Preferably, the focusing target region has a rectangular shape.

Preferably, the processor is configured to, in a case where the focusing target region does not include a plurality of blocks, divide the focusing target region into the number of blocks according to a type of the specific object.

Preferably, the processor is configured to acquire a defocus amount for non-focus control based on the image signal of a region that is outside the overlapping region and is inside the search region.

Preferably, the processor is configured to highlight and display the overlapping region on a display device by changing a color of a frame of the overlapping region, a shape of the frame, or a line type of the frame.

Preferably, the processor is configured to detect the object region by inputting the image signal of the search region into a machine-trained model.

Preferably, the processor is configured to, in a case where the search region determined based on the focusing target region is smaller than a defined size, set a size of the search region to the defined size.

Preferably, the processor is configured to, in a case where the detected object region is a specific portion, change a size of the search region according to a type or a size of the portion.

According to the present disclosure, there is provided an imaging apparatus comprising: the focus control device; the imaging element; and the operating device.

According to the present disclosure, there is provided a focus control method performed by a processor, the method comprising: acquiring an image signal output from an imaging element; setting a focusing target region in an imaging region based on output information from an operating device that receives an operation by a user; determining a search region based on the focusing target region; detecting an object region including a specific object from the search region; detecting an overlapping region in which the focusing target region and the object region overlap each other; and performing focus control based on the image signal of the overlapping region.

According to the present disclosure, there is provided a program causing a processor to execute a process comprising: acquiring an image signal output from an imaging element; setting a focusing target region in an imaging region based on output information from an operating device that receives an operation by a user; determining a search region based on the focusing target region; detecting an object region including a specific object from the search region; detecting an overlapping region in which the focusing target region and the object region overlap each other; and performing focus control based on the image signal of the overlapping region.

BRIEF DESCRIPTION OF THE DRAWINGS

Exemplary embodiments according to the technique of the present disclosure will be described in detail based on the following figures, wherein.

DETAILED DESCRIPTION

An example of an embodiment according to the technology of the present disclosure will be described with reference to the accompanying drawings.

First, the terms used in the following description will be described.

In the following description, "IC" is an abbreviation for "integrated circuit". "CPU" is an abbreviation for "central processing unit". "ROM" is an abbreviation for "read only memory". "RAM" is an abbreviation for "random access memory". "CMOS" is an abbreviation for "complementary metal oxide semiconductor".

"FPGA" is an abbreviation for "field programmable gate array". "PLD" is an abbreviation for "programmable logic device". "ASIC" is an abbreviation for "application specific integrated circuit". "OVF" is an abbreviation for "optical view finder". "EVF" is an abbreviation for "electronic view finder". "CNN" is an abbreviation for "convolutional neural network". "AF" is an abbreviation of "auto focus". "R-CNN" is an abbreviation for "regions with convolutional neural networks".

As one embodiment of an imaging apparatus, the technology of the present disclosure will be described by using a lens-interchangeable digital camera as an example. Note that the technology of the present disclosure is not limited to the lens-interchangeable type and can also be applied to a lens-integrated digital camera.

Figure 1:
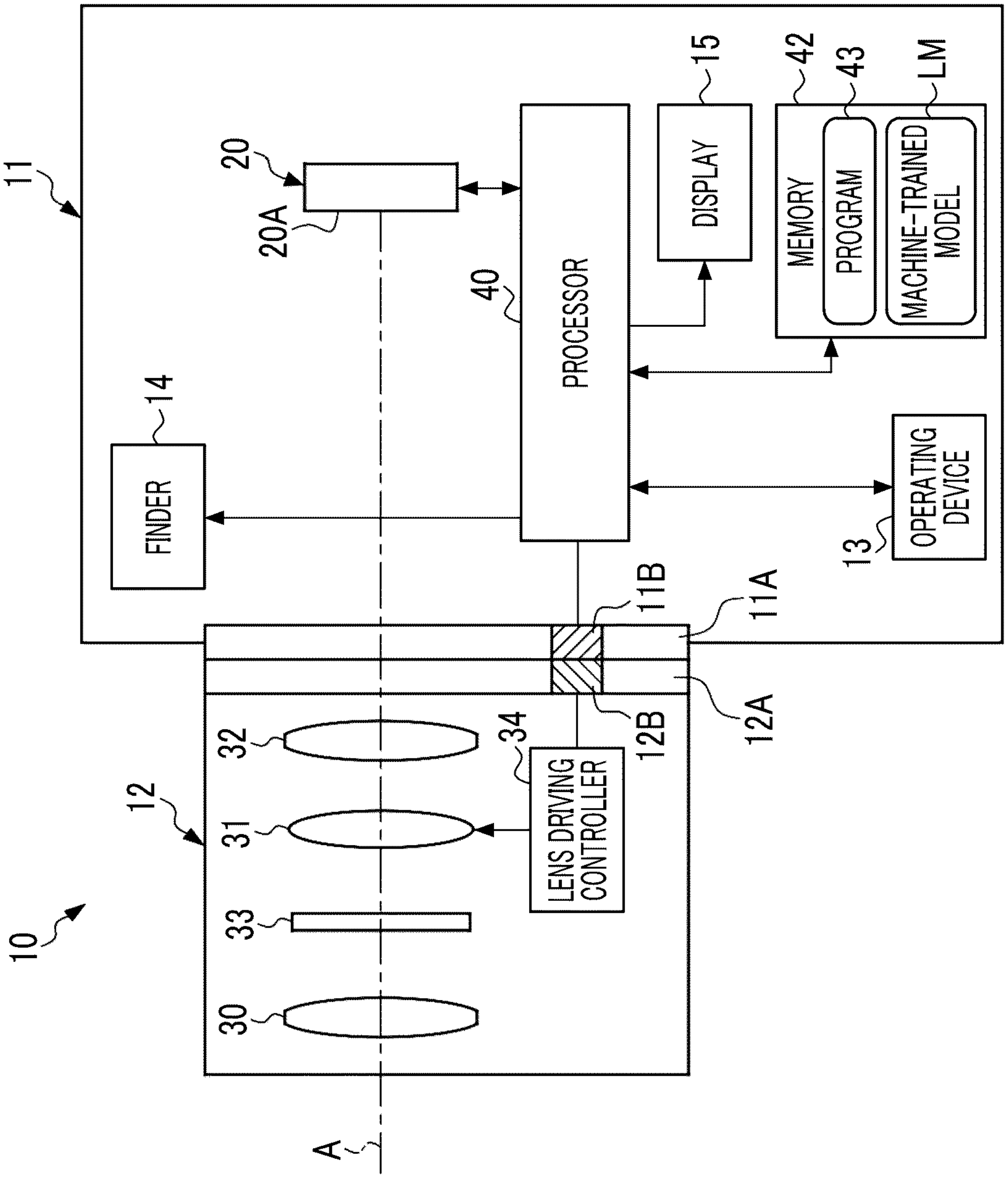
FIG. 1 is a diagram illustrating an example of an internal configuration of an imaging apparatus.

FIG. 1 illustrates an example of a configuration of an imaging apparatus 10. The imaging apparatus 10 is a lens-interchangeable digital camera. The imaging apparatus 10 includes a body 11 and an imaging lens 12 interchangeably mounted on the body 11. The imaging lens 12 is attached to a front surface side of the body 11 via a camera side mount 11A and a lens side mount 12A.

The body 11 is provided with an operating device 13 that includes a dial, a release button, a touch panel, and the like and receives an operation by a user. Examples of an operation mode of the imaging apparatus 10 include a still image capturing mode, a video capturing mode, and an image display mode. The operating device 13 is operated by the user in a case of setting the operation mode. In addition, the operating device 13 is operated by the user in a case of starting an execution of still image capturing or video capturing. Further, the operating device 13 is operated by the user in a case where an AF area, which is a focusing target, is designated from an imaging region. Note that the AF area is an example of a "focusing target region" according to the technique of the present disclosure.

Further, the body 11 is provided with a finder 14. Here, the finder 14 is a hybrid finder (registered trademark). The hybrid finder refers to, for example, a finder in which an optical view finder (hereinafter, referred to as "OVF") and an electronic view finder (hereinafter, referred to as "EVF") are selectively used. The user can observe an optical image or a live view image of a subject projected onto the finder 14 via a finder eyepiece portion (not illustrated).

In addition, a display 15 is provided on a rear surface side of the body 11. The display 15 displays an image based on an image signal obtained through imaging, various menu screens, and the like. The user can also observe the live view image projected onto the display 15 instead of the finder 14. Note that the display 15 is an example of a "display device" according to the technology of the present disclosure.

The body 11 and the imaging lens 12 are electrically connected to each other through contact between an electrical contact 11B provided on the camera side mount 11A and an electrical contact 12B provided on the lens side mount 12A.

The imaging lens 12 includes an objective lens 30, a focus lens 31, a rear end lens 32, and a stop 33. Respective members are arranged in the order of the objective lens 30, the stop 33, the focus lens 31, and the rear end lens 32 from an objective side along an optical axis A of the imaging lens 12. The objective lens 30, the focus lens 31, and the rear end lens 32 constitute an imaging optical system. The type, number, and arrangement order of the lenses constituting the imaging optical system are not limited to the example illustrated in FIG. 1.

In addition, the imaging lens 12 includes a lens driving controller 34. The lens driving controller 34 includes, for example, a CPU, a RAM, a ROM, and the like. The lens driving controller 34 is electrically connected to a processor 40 inside the body 11 via the electrical contact 12B and the electrical contact 11B.

The lens driving controller 34 drives the focus lens 31 and the stop 33 based on a control signal transmitted from the processor 40. The lens driving controller 34 performs drive control of the focus lens 31 based on a control signal for focus control that is transmitted from the processor 40, in order to adjust a focusing position of the imaging lens 12. The processor 40 performs focusing position detection using a phase difference method. The focusing position is represented by a defocus amount.

The stop 33 has an opening in which an opening diameter is variable with the optical axis A as a center. The lens driving controller 34 performs drive control of the stop 33 based on a control signal for stop adjustment that is transmitted from the processor 40, in order to adjust an amount of light incident on a light-receiving surface 20A of an imaging sensor 20.

Further, the imaging sensor 20, the processor 40, and a memory 42 are provided inside the body 11. The operations of the imaging sensor 20, the memory 42, the operating device 13, the finder 14, and the display 15 are controlled by the processor 40.

The processor 40 is configured by, for example, a CPU. In this case, the processor 40 executes various types of processing based on a program 43 stored in the memory 42. Note that the processor 40 may be configured by an assembly of a plurality of IC chips. In addition, the memory 42 stores a machine-trained model LM that is trained through machine learning for performing object region detection. The processor 40 and the memory 42 constitute a focus control device.

The imaging sensor 20 is, for example, a CMOS-type image sensor. The imaging sensor 20 is disposed such that the optical axis A is orthogonal to the light-receiving surface 20A and the optical axis A is located at the center of the light-receiving surface 20A. Light passing through the imaging lens 12 is incident on the light-receiving surface 20A. A plurality of pixels for generating signals through photoelectric conversion are formed on the light-receiving surface 20A. The imaging sensor 20 generates and outputs an image signal D by photoelectrically converting the light incident on each pixel. Note that the imaging sensor 20 is an example of an "imaging element" according to the technology of the present disclosure.

In addition, a color filter array of a Bayer array is disposed on the light-receiving surface of the imaging sensor 20, and a color filter of any one of red (R), green (G), or blue (B) is disposed to face each pixel. Note that some of the plurality of pixels arranged on the light-receiving surface of the imaging sensor 20 may be phase difference detection pixels for detecting a phase difference related to focus control.

Figure 2:
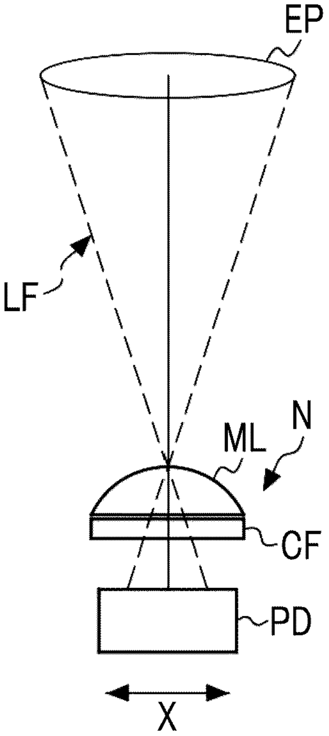
FIG. 2 is a diagram illustrating an example of a configuration of an imaging pixel.
Figure 3:
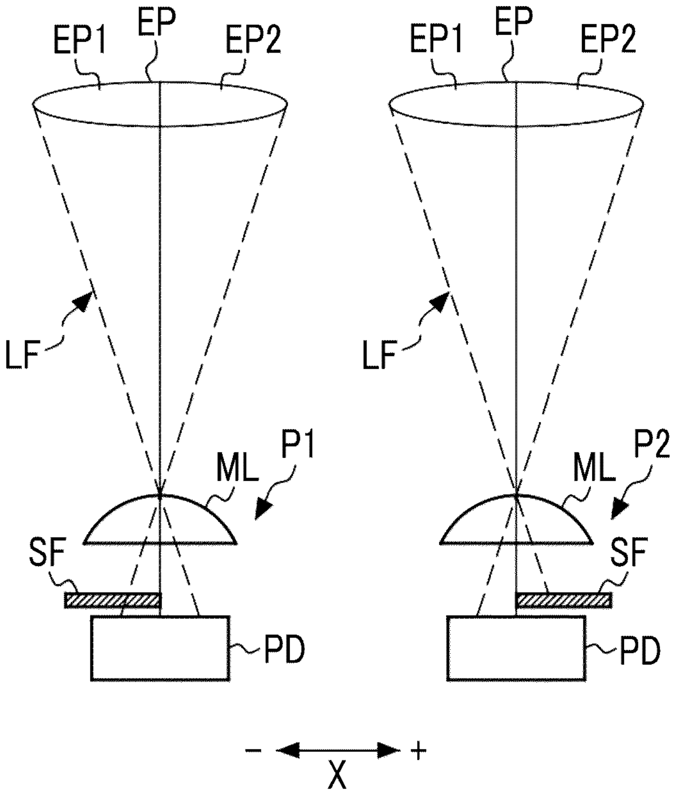
FIG. 3 is a diagram illustrating an example of a configuration of a phase difference detection pixel.

FIG. 2 illustrates an example of a configuration of an imaging pixel N. FIG. 3 illustrates an example of configurations of phase difference detection pixels P1 and P2. Each of the phase difference detection pixels P1 and P2 receives one of rays of luminous flux split in an X direction with a main light ray as the center. Hereinafter, a direction orthogonal to the X direction will be referred to as a Y direction. In addition, the X direction corresponds to a horizontal direction, and the Y direction corresponds to a vertical direction.

As illustrated in FIG. 2, the imaging pixel N includes a photodiode PD serving as a photoelectric conversion element, a color filter CF, and a microlens ML. The color filter CF is disposed between the photodiode PD and the microlens ML.

The color filter CF is a filter that transmits light of any of R, G, or B. The microlens ML converges a luminous flux LF incident from an exit pupil EP of the imaging lens 12 to substantially the center of the photodiode PD via the color filter CF.

As illustrated in FIG. 3, each of the phase difference detection pixels P1 and P2 includes a photodiode PD, a light shielding layer SF, and a microlens ML. The microlens ML converges, similarly to the imaging pixel N, the luminous flux LF incident from the exit pupil EP of the imaging lens 12 to substantially the center of the photodiode PD.

The light shielding layer SF is formed of a metal film or the like and is disposed between the photodiode PD and the microlens ML. The light shielding layer SF blocks a part of the luminous flux LF incident on the photodiode PD via the microlens ML.

In the phase difference detection pixel P1, the light shielding layer SF blocks light on a negative side in the X direction with the center of the photodiode PD as a reference. That is, in the phase difference detection pixel P1, the light shielding layer SF makes the luminous flux LF from a negative side exit pupil EP1 incident on the photodiode PD, and blocks the luminous flux LF from a positive side exit pupil EP2 in the X direction.

In the phase difference detection pixel P2, the light shielding layer SF blocks light on a positive side in the X direction with the center of the photodiode PD as a reference. That is, in the phase difference detection pixel P2, the light shielding layer SF makes the luminous flux LF from the positive side exit pupil EP2 incident on the photodiode PD, and blocks the luminous flux LF from the negative side exit pupil EP1 in the X direction.

That is, the phase difference detection pixel P1 and the phase difference detection pixel P2 have mutually different light shielding positions in the X direction. A phase difference detection direction of the phase difference detection pixels P1 and P2 is the X direction (that is, the horizontal direction).

Figure 4:
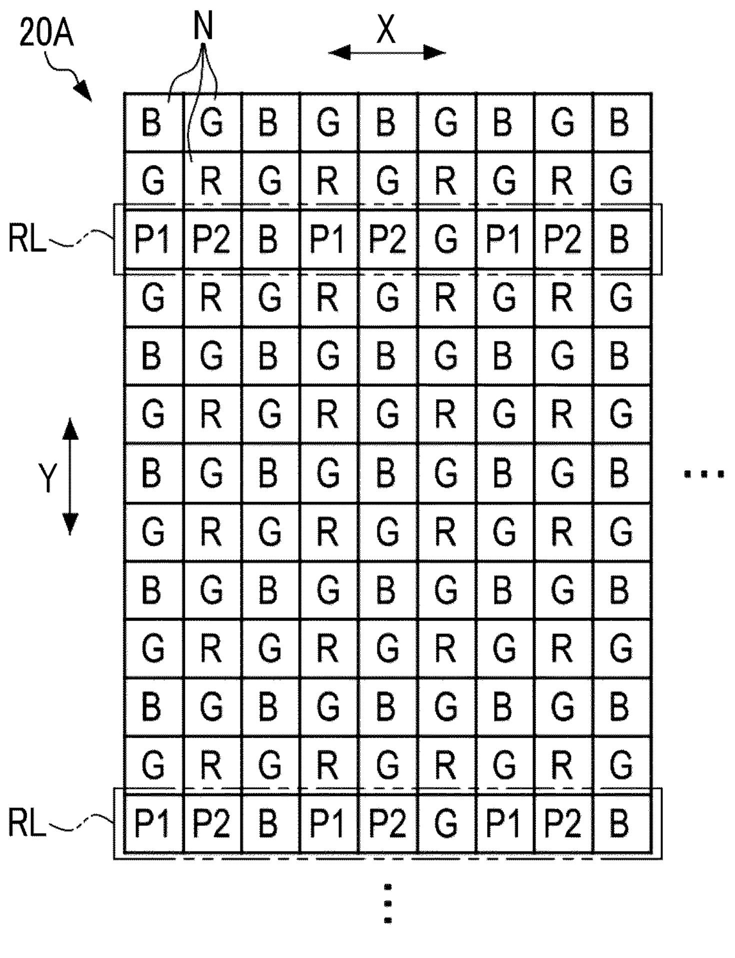
FIG. 4 is a diagram illustrating an example of pixel arrangement of an imaging sensor.

FIG. 4 illustrates an example of pixel arrangement of the imaging sensor 20. "R" in FIG. 4 indicates the imaging pixel N provided with the color filter CF of R. "G" indicates the imaging pixel N provided with the color filter CF of G. "B" indicates the imaging pixel N provided with the color filter CF of B. Note that the color arrangement of the color filter CF is not limited to the Bayer array and may be another color arrangement.

Rows RL including the phase difference detection pixels P1 and P2 are arranged every 10 pixels in the Y direction. In each row RL, a pair of phase difference detection pixels P1 and P2 and one imaging pixel N are repeatedly arranged in the Y direction. Note that an arrangement pattern of the phase difference detection pixels P1 and P2 is not limited to the example illustrated in FIG. 4. For example, a pattern in which a plurality of phase difference detection pixels are disposed in one microlens ML as illustrated in FIG. 5 attached to JP2018-56703A may be used.

Figure 5:
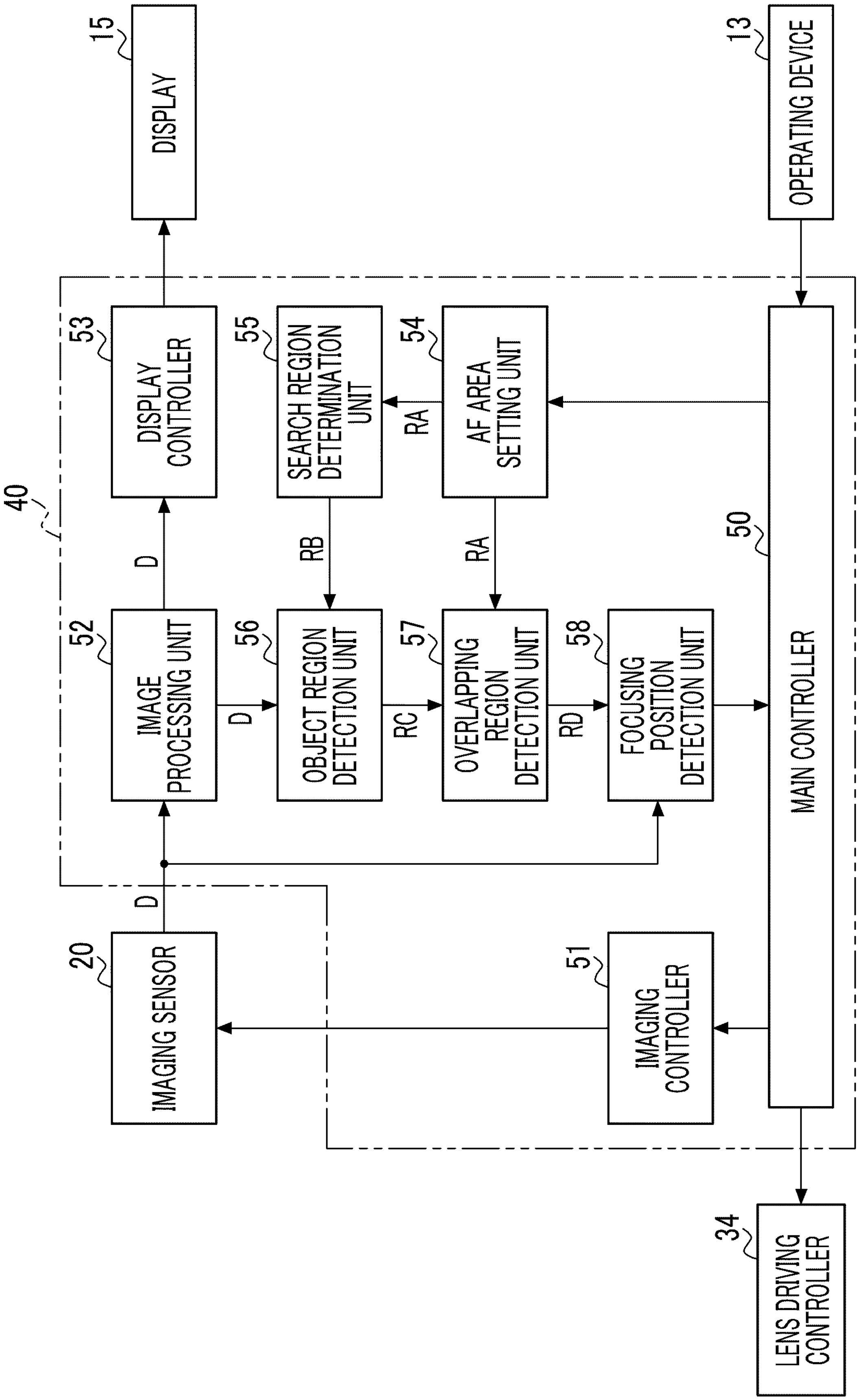
FIG. 5 is a block diagram illustrating an example of a functional configuration of a processor.

FIG. 5 illustrates an example of a functional configuration of the processor 40. The processor 40 implements various functional units by executing processing in accordance with the program 43 stored in the memory 42. As illustrated in FIG. 5, for example, the processor 40 implements a main controller 50, an imaging controller 51, an image processing unit 52, a display controller 53, an AF area setting unit 54, a search region determination unit 55, an object region detection unit 56, an overlapping region detection unit 57, and a focusing position detection unit 58.

The main controller 50 comprehensively controls the operation of the imaging apparatus 10 based on output information from the operating device 13. The imaging controller 51 executes imaging processing of causing the imaging sensor 20 to perform an imaging operation by controlling the imaging sensor 20. The imaging controller 51 drives the imaging sensor 20 in the still image capturing mode or the video capturing mode.

The imaging sensor 20 outputs an image signal D including an imaging signal SN generated by the imaging pixel N and a phase difference detection signal SP generated by the phase difference detection pixels P1 and P2. The imaging sensor 20 outputs the image signal D to the image processing unit 52. Further, the imaging sensor 20 outputs the image signal D to the focusing position detection unit 58.

The image processing unit 52 acquires the image signal D output from the imaging sensor 20, and performs image processing such as demosaicing on the acquired image signal D.

The display controller 53 causes the display 15 to display an image represented by the image signal D obtained by performing the image processing by the image processing unit 52. In addition, the display controller 53 causes the display 15 to perform live view image display based on the image signal D that is periodically input from the image processing unit 52 during an imaging preparation operation before the still image capturing or the video capturing. Further, the display controller 53 causes the display 15 to display the AF area RA that is designated by the user using the operating device 13, an overlapping region RD that is detected by the overlapping region detection unit 57, and the like. For example, the operating device 13 is a touch panel provided on a display surface of the display 15, and the user can designate the AF area RA by touching the touch panel with a finger.

The AF area setting unit 54 sets a rectangular AF area RA in the imaging region based on output information from the operating device 13. For example, the AF area RA includes a plurality of blocks. The user can designate positions, the number, an arrangement direction, and the like of the blocks by operating the operating device 13.

The search region determination unit 55 determines a search region RB for searching a specific object based on the AF area RA which is set by the AF area setting unit 54. The search region determination unit 55 determines a search region RB such that the AF area RA is included in the imaging region. For example, the search region determination unit 55 determines a search region RB based on a long side of the AF area RA. The search region RB has a rectangular shape. Note that the user can designate a type (a human face, a bird, an airplane, a car, or the like) of a specific object to be detected, by using the operating device 13.

The object region detection unit 56 detects an object region RC including a specific object from the search region RB determined by the search region determination unit 55. Specifically, the object region detection unit 56 cuts out a portion corresponding to the search region RB from the image represented by the image signal D, and detects the object region RC by inputting the cut-out image to the machine-trained model LM. In other words, the object region detection unit 56 detects the object region RC by inputting the image signal D of the search region RB to the machine-trained model LM. Note that the object region detection unit 56 may input only the imaging signal SN included in the image signal D of the search region RB to the machine-trained model LM.

The overlapping region detection unit 57 detects an overlapping region RD in which the AF area RA and the object region RC overlap each other. Specifically, the overlapping region detection unit 57 calculates an overlap ratio of each of the plurality of blocks included in the AF area RA with the object region RC, and detects one or a plurality of blocks at which the overlap ratio is equal to or higher than a threshold value as an overlapping region RD.

The focusing position detection unit 58 acquires a defocus amount for focus control based on the image signal D of the overlapping region RD detected by the overlapping region detection unit 57. Specifically, the focusing position detection unit 58 acquires a defocus amount for focus control based on the phase difference detection signal SP included in the image signal D of the overlapping region RD. More specifically, the focusing position detection unit 58 calculates a defocus amount by performing correlation calculation based on the phase difference detection signals SP output from the plurality of phase difference detection pixels P1 and the phase difference detection signals SP output from the plurality of phase difference detection pixels P2.

The main controller 50 drives the focus lens 31 through the lens driving controller 34 based on the defocus amount for focus control that is acquired by the focusing position detection unit 58. Thereby, the object detected by the object region detection unit 56 is brought into an in-focus state.

Figure 6:
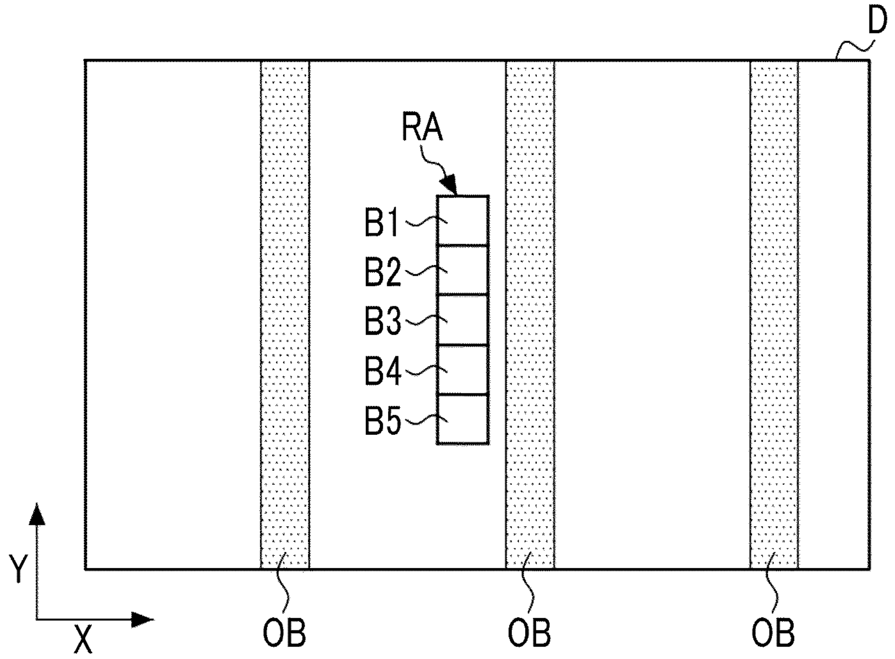
FIG. 6 is a diagram illustrating an example of an AF area.

FIG. 6 illustrates an example of the AF area RA. In the example illustrated in FIG. 6, an obstacle OB appears in the image represented by the image signal D, and the user designates the AF area RA to avoid the obstacle OB by operating the operating device 13. In the example illustrated in FIG. 6, the obstacle OB is a barrier extending in the Y direction, and the user designates an AF area RA having a shape extending in the Y direction.

Further, in the example illustrated in FIG. 6, the AF area RA includes a plurality of rectangular blocks B1 to B5. Each of the plurality of blocks B1 to B5 has the same shape and the same size. The number of the phase difference detection pixels P1 and P2 included in the block changes. As a result, the reliability of the defocus amount to be calculated varies depending on the shape and the size of the block. In the present embodiment, since the shape and the size of each block are the same, it is possible to reduce a variation in the reliability of the defocus amount to be calculated from each block.

The user can designate the position of the AF area RA and the number of blocks in the X direction and the Y direction by operating the operating device 13. Thereby, the user can appropriately set a position, a shape (for example, an aspect ratio), and a size of the AF area RA to avoid the obstacle OB. The AF area setting unit 54 sets the AF area RA in the imaging region based on information such as the position of the AF area RA designated by the user and the number of blocks.

Figure 7:
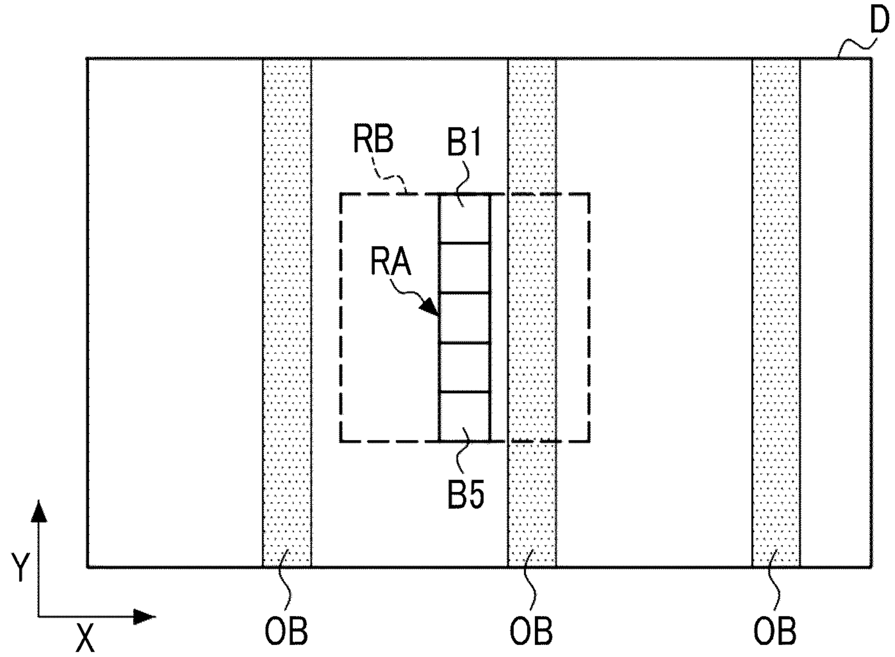
FIG. 7 is a diagram illustrating an example of a search region.

FIG. 7 illustrates an example of the search region RB. As illustrated in FIG. 7, in a case where the plurality of blocks B1 to B5 included in the AF area RA are arranged in the Y direction and the AF area RA is extended in the Y direction, the search region determination unit 55 determines a search region RB as a rectangular region of which two sides are in contact with both ends of the AF area RA in the Y direction (that is, a long side direction). That is, the search region determination unit 55 determines a search region RB based on the long side of the AF area RA.

In the example illustrated in FIG. 7, the search region RB is determined to be in contact with the blocks B1 and B5 located at the end portions of the AF area RA in the Y direction. The search region RB is a rectangular region having sides parallel to the X direction and sides parallel to the Y direction, and a ratio of the number of pixels in the X direction to the number of pixels in the Y direction is preferably 1:1 (that is, an aspect ratio is 1:1). This is because it is preferable that the aspect ratio of the image which is input to the trained model LM is 1:1.

Figure 8:
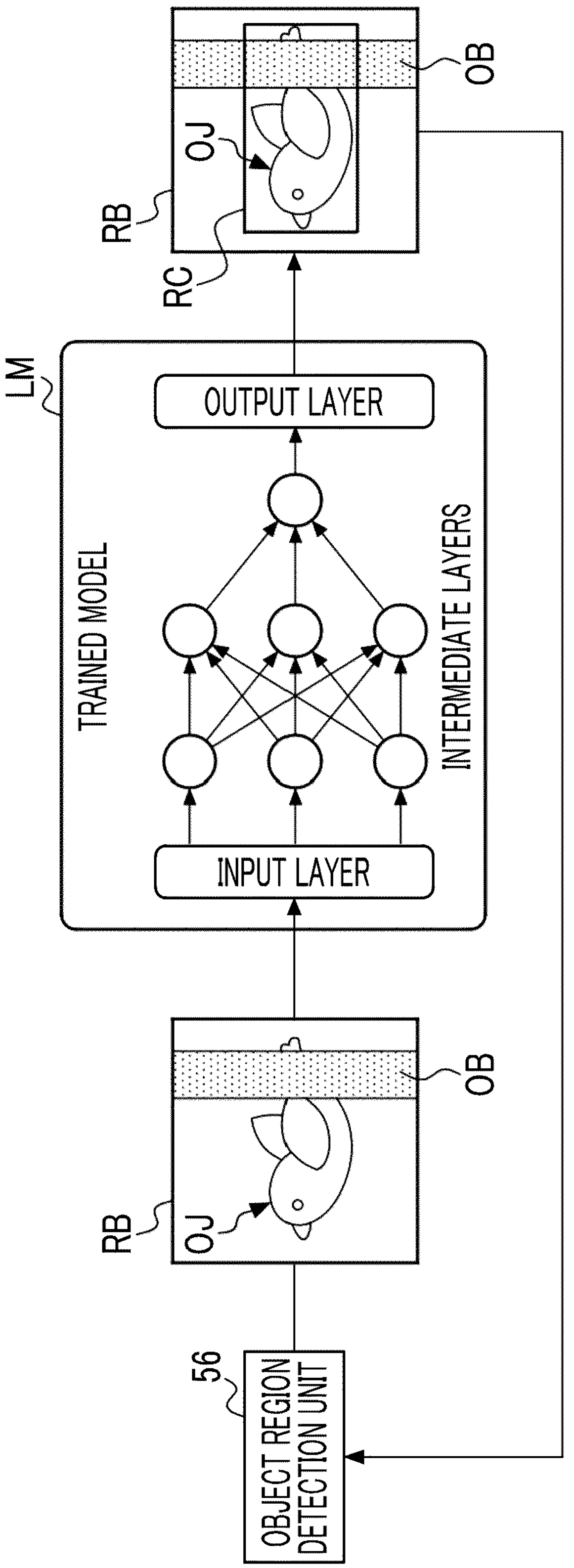
FIG. 8 is a flowchart illustrating an example of object region detection processing.

FIG. 8 illustrates an example of object region detection processing by the object region detection unit 56. The trained model LM includes a neural network including an input layer, intermediate layers, and an output layer. The intermediate layer includes a plurality of neurons. The number of the intermediate layers and the number of neurons in each intermediate layer can be changed as appropriate. The trained model LM may be an R-CNN.

The trained model LM is obtained by performing machine learning so as to detect an object region including a specific object in an image, using a plurality of images in which the specific object appears as training data. The trained model LM may be trained by performing machine learning by a computer outside the imaging apparatus 10.

The object region detection unit 56 inputs, to the machine-trained model LM, an image (hereinafter, referred to as a cutout image) obtained by cutting out a portion corresponding to the search region RB from the image represented by the image signal D. The machine-trained model LM detects an object region RC including a specific object OJ from the cutout image, and outputs information indicating the object region RC on the cutout image. The object region detection unit 56 outputs information representing the object region RC output from the machine-trained model LM to the overlapping region detection unit 57.

Figure 9:
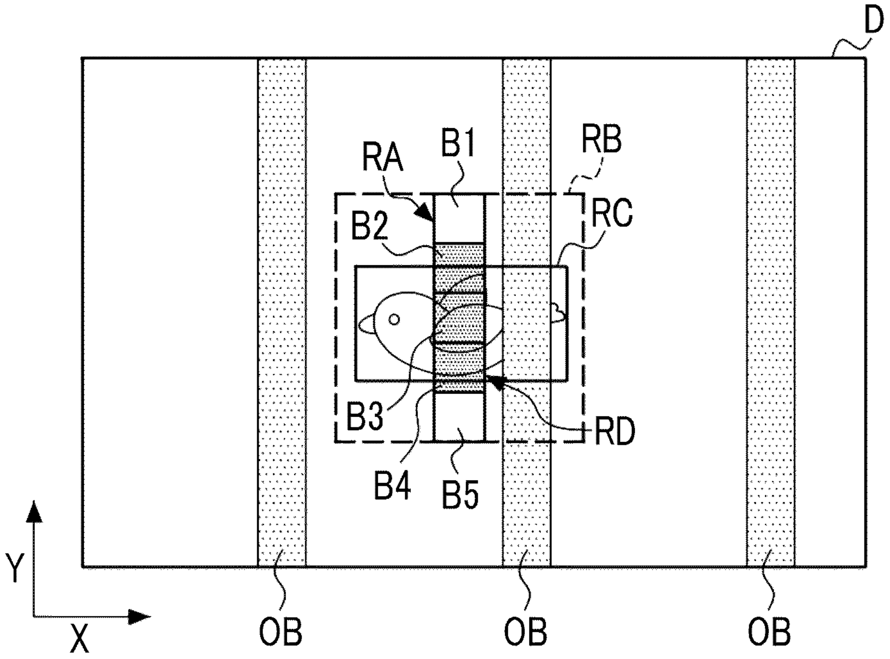
FIG. 9 is a diagram illustrating an example of an overlapping region.

FIG. 9 illustrates an example of an overlapping region RD. In the example illustrated in FIG. 9, among the plurality of blocks B1 to B5 included in the AF area RA, blocks B2 to B4 overlap the object region RC. Therefore, in the example illustrated in FIG. 9, the overlapping region detection unit 57 detects the blocks B2 to B4 as the overlapping region RD.

Figure 10:
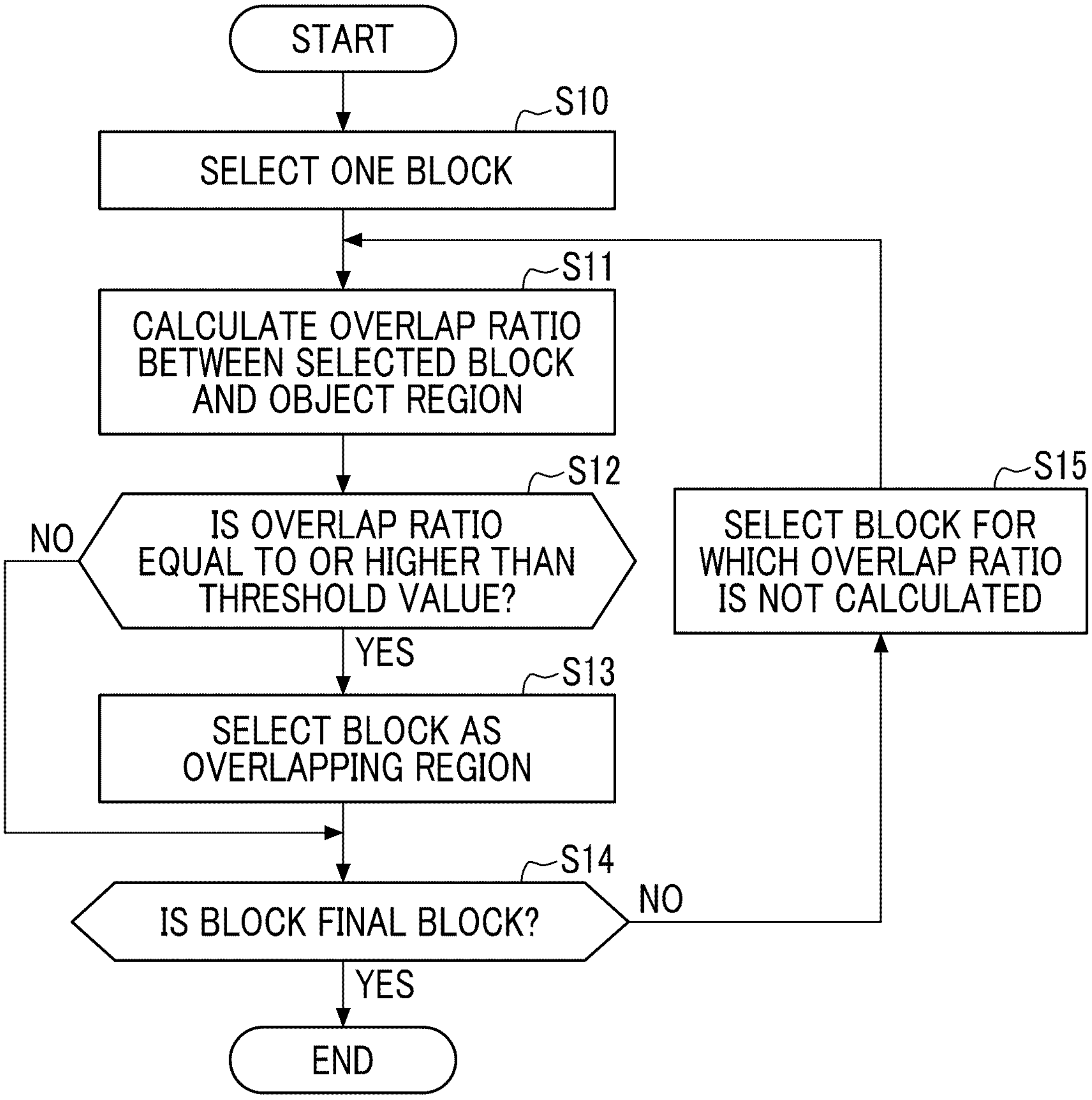
FIG. 10 is a flowchart illustrating an example of overlapping region detection processing.

FIG. 10 illustrates an example of overlapping region detection processing by the overlapping region detection unit 57. In the overlapping region detection processing, first, the overlapping region detection unit 57 selects one block from among the plurality of blocks included in the AF area RA (step S10). Next, the overlapping region detection unit 57 calculates an overlap ratio between the selected block and the object region RC (step S11). Here, the overlap ratio means an overlap ratio of the object region RC with the blocks.

Next, the overlapping region detection unit 57 determines whether or not the calculated overlap ratio is equal to or higher than a threshold value (step S12). In a case where the overlap ratio is equal to or higher than the threshold value (YES in step S12), the overlapping region detection unit 57 selects the block as the overlapping region RD (step S13). On the other hand, in a case where the overlap ratio is lower than the threshold value (NO in step S12), the overlapping region detection unit 57 transitions to processing of step S14.

In step S14, the overlapping region detection unit 57 determines whether or not the block is the final block. In a case where the block is not the final block (NO in step S14), the overlapping region detection unit 57 selects a block for which the overlap ratio is not calculated, from the plurality of blocks included in the AF area RA (step S15).

After step S15, the overlapping region detection unit 57 returns to processing of step S11. The overlapping region detection unit 57 repeats processing of step S11 to step S15, and ends the overlapping region detection processing in a case where it is determined in step S14 that the block is the final block. The overlapping region RD includes one or a plurality of blocks selected in step S13.

Figure 11:
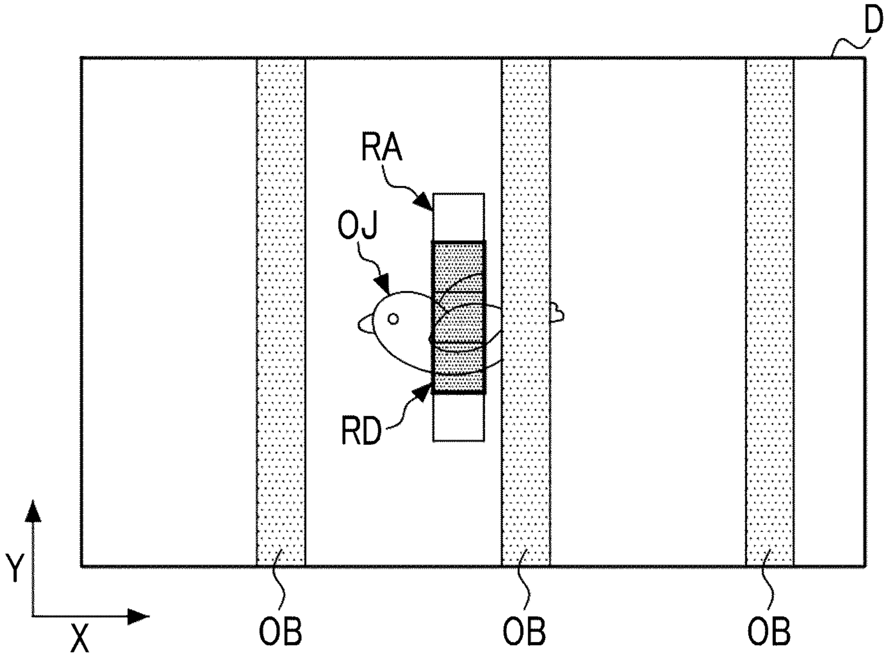
FIG. 11 is a diagram illustrating an example of an image displayed on a display.

FIG. 11 illustrates an example of an image displayed on the display 15 by the display controller 53. The main controller 50 displays the AF area RA and the overlapping region RD in the image represented by the image signal D through the display controller 53. The main controller 50 highlights and displays the overlapping region RD by changing a color of a frame of the overlapping region RD, a shape of the frame, or a line type of the frame. In the example illustrated in FIG. 11, the main controller 50 highlights and displays the overlapping region RD by setting the frame of the overlapping region RD to be a thick line and changing the color of the AF area RA and the color of the overlapping region RD. Note that the overlapping region RD may be displayed without displaying the AF area RA.

Figure 12:
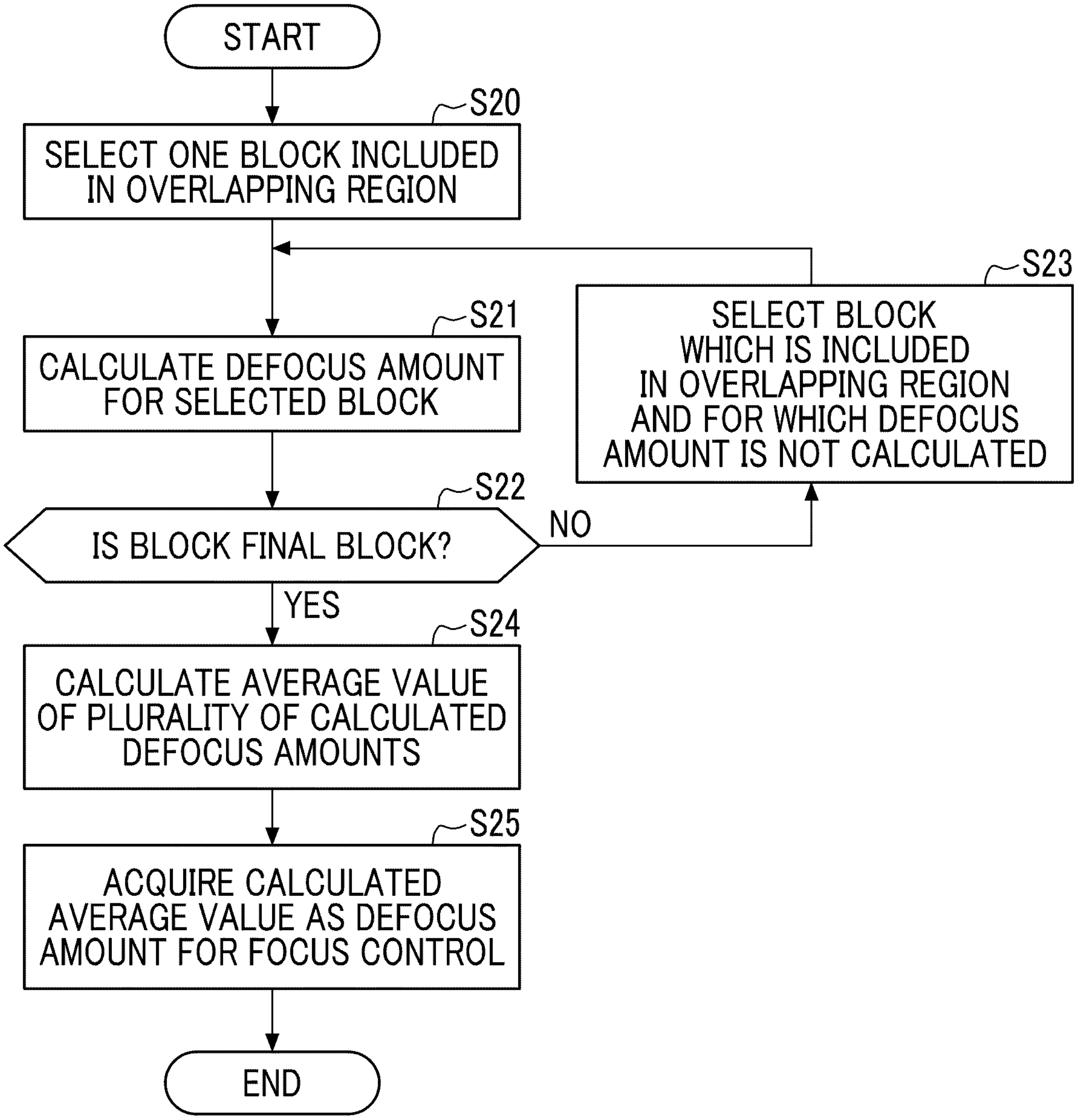
FIG. 12 is a flowchart illustrating an example of focusing position detection processing.

FIG. 12 illustrates an example of focusing position detection processing by the focusing position detection unit 58. In the focusing position detection processing, first, the focusing position detection unit 58 selects one block included in the overlapping region RD (step S20). The focusing position detection unit 58 calculates a defocus amount for the selected block (step S21). In step S21, the focusing position detection unit 58 calculates the defocus amount by performing correlation calculation based on the phase difference detection signal SP included in the image signal D of the block.

Next, the focusing position detection unit 58 determines whether or not the block is a final block (step S22). In a case where the block is not a final block (NO in step S22), the focusing position detection unit 58 selects the block which is included in the overlapping region RD and for which the defocus amount is not calculated (step S23). After step S23, the focusing position detection unit 58 returns to processing of step S21. The focusing position detection unit 58 repeats processing of step S21 to step S23, and transitions to processing of step S24 in a case where it is determined in step S22 that the block is a final block.

In step S24, the focusing position detection unit 58 calculates an average value of a plurality of defocus amounts calculated in step S21. In addition, the focusing position detection unit 58 acquires the calculated average value as a defocus amount for focus control (step S25).

Figure 13:
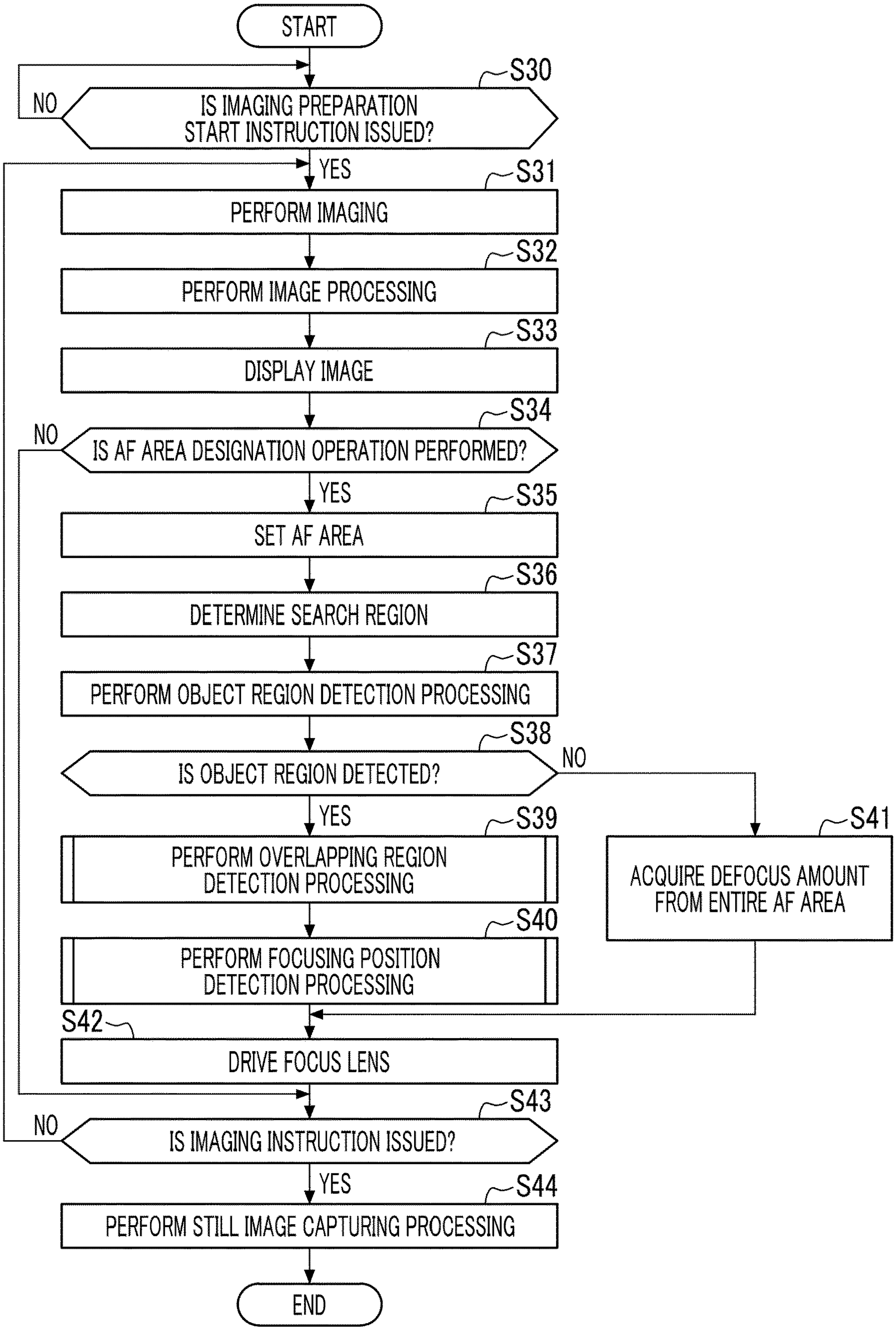
FIG. 13 is a flowchart illustrating a flow of overall processing executed by the imaging apparatus.

FIG. 13 illustrates a flow of the overall processing executed by the imaging apparatus 10. FIG. 13 illustrates an example of a case where the live view image display is performed during the imaging preparation operation in the still image capturing mode.

First, the main controller 50 determines whether or not an imaging preparation start instruction is issued by the user through the operation of the operating device 13 (step S30). In a case where an imaging preparation start instruction is issued (YES in step S30), the main controller 50 controls the imaging controller 51 to cause the imaging sensor 20 to perform an imaging operation (step S31).

The image processing unit 52 acquires the image signal D output from the imaging sensor 20, and performs the image processing on the image signal D (step S32). The display controller 53 causes the display 15 to display the image represented by the image signal D obtained by performing the image processing (step S33).

Next, the main controller 50 determines whether or not the user performs an operation of designating an AF area RA using the operating device 13 (hereinafter, referred to as an AF area designation operation) (step S34). In a case where an AF area designation operation is not performed (NO in step S34), the main controller 50 transitions to processing of step S43.

In a case where an AF area designation operation is performed (YES in step S34), the AF area setting unit 54 sets an AF area RA in the imaging region based on output information from the operating device 13 (step S35). The search region determination unit 55 determines a search region RB based on the AF area RA that is set (step S36).

Next, the object region detection unit 56 detects an object region RC by performing the above-described object region detection processing (step S37). The main controller 50 determines whether or not an object region RC is detected by the object region detection unit 56 (step S38).

In a case where an object region RC is detected (YES in step S38), the overlapping region detection unit 57 detects an overlapping region RD by performing the above-described overlapping region detection processing (step S39). In addition, the focusing position detection unit 58 acquires a defocus amount for focus control by performing the above-described focusing position detection processing (step S40).

In a case where an object region RC is not detected (NO in step S38), the focusing position detection unit 58 acquires a defocus amount for focus control from the entire AF area RA (step S41). Note that, in a case where an overlapping region RD is not detected in step S39, the focusing position detection unit 58 may acquire a defocus amount for focus control from the entire AF area RA.

After step S40 or step S41, the main controller 50 drives the focus lens 31 based on the acquired defocus amount for focus control (step S42).

Next, the main controller 50 determines whether or not an imaging instruction is issued by the user through the operation of the operating device 13 (step S43). The main controller 50 returns to processing of step S31 in a case where an operation instruction is not issued (NO in step S43). The processing of step S31 to step S43 is repeatedly executed until the main controller 50 determines that an imaging instruction is issued in step S43.

In a case where an imaging instruction is issued (YES in step S43), the main controller 50 causes the imaging sensor 20 to perform an imaging operation, and performs still image capturing processing of recording, as a still image, the image signal D obtained by performing image processing by the image processing unit 52 in the memory 42 (step S21).

In the technique of the present disclosure, the object region detection is performed from the search region RB that is determined based on the AF area RA designated by the user. Therefore, it is possible to detect the object region RC including the object, which is intended by the user as a focusing target, at high speed. Further, in the technique of the present disclosure, focus control is performed based on the image signal D of the overlapping region RD in which the AF area RA and the object region RC overlap each other. Therefore, it is possible to perform focus control on the object, which is intended by the user as a focusing target, with high accuracy. That is, according to the technology of the present disclosure, it is possible to perform focus control on the object, which is intended by the user as a focusing target, at high speed and with high accuracy.

Modification Example

Hereinafter, various modification examples of the above-described embodiment will be described.

In the above-described embodiment, the user can designate the positions, the number, the arrangement direction, and the like of the blocks included in the AF area RA by using the operating device 13. On the other hand, only a position, a shape (for example, the aspect ratio), and a size of the AF area RA may be designated. In this manner, in a case where the AF area RA designated by the user does not include a plurality of blocks, the AF area setting unit 54 may divide the AF area RA designated by the user into a plurality of blocks. In this case, preferably, the AF area setting unit 54 sets the blocks to have the same shape and the same size.

In addition, in a case where the AF area RA designated by the user does not include a plurality of blocks, the AF area setting unit 54 may divide the AF area RA into the number of blocks corresponding to the type of the specific object to be detected. The depth information required for focus control differs depending on the type of the object. For this reason, in a case where the object is an object that requires a large amount of depth information such as a bird, the number of block divisions is increased. On the other hand, in a case where the object is an object that does not require much depth information, such as a car, the number of block divisions is decreased. As the number of block divisions is smaller, focus control can be performed at higher speed, and focus control can be performed on the object such as a fast-moving car with high accuracy. In this way, by adjusting the number of block divisions, it is possible to achieve a balance between the accuracy and the speed of the focus control.

Further, in a case where the AF area RA designated by the user does not include a plurality of blocks, the AF area setting unit 54 may set the AF area RA without dividing the AF area RA into a plurality of blocks. In this case, the overlapping region detection unit 57 detects, as the overlapping region RD, a region at which the overlap ratio of the AF area RA and the object region RC is equal to or higher than the threshold value, and the focusing position detection unit 58 acquires the defocus amount for focus control based on the image signal D of the overlapping region RD. Note that, in a case where the overlap ratio of the AF area RA and the object region RC is lower than the threshold value, the focusing position detection unit 58 may acquire the defocus amount for focus control based on the image signal D of the AF area RA.

In the above-described embodiment, the focusing position detection unit 58 acquires, as the defocus amount for focus control, an average value of the defocus amounts of the blocks included in the overlapping region RD. Alternatively, the focusing position detection unit 58 may acquire, as the defocus amount for focus control, a weighted average value obtained by weighting and averaging the defocus amounts of the blocks by using, as weights, the overlap ratios of the blocks with the object region RC. For example, the weight is increased as the overlap ratio is increased. Alternatively, a weighted average value obtained by weighting and averaging the defocus amounts of the blocks by using, as a weight, a type of a portion of the object positioned in each block may be used as the defocus amount for focus control. For example, the weight is increased as the portion is more important as the focusing target.

Figure 14:
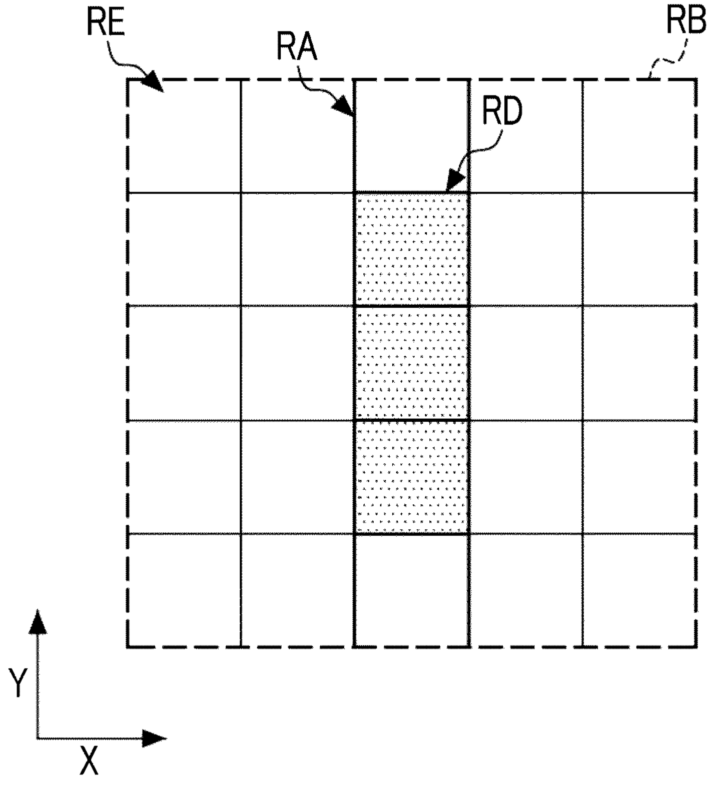
FIG. 14 is a diagram illustrating an example of a peripheral region for acquiring a defocus amount for non-focus control.

In the above-described embodiment, the focusing position detection unit 58 acquires the defocus amount for focus control from the overlapping region RD. On the other hand, a defocus amount for non-focus control may be acquired based on the image signal D of a region outside the overlapping region RD and within the search region RB (hereinafter, referred to as a peripheral region). For example, as illustrated in FIG. 14, the focusing position detection unit 58 divides a peripheral region RE into blocks, and acquires, as a defocus amount for non-focus control, a defocus amount calculated from the blocks. Preferably, each block of the peripheral region RE has the same shape and the same size as each block of the AF area RA. The defocus amount for non-focus control is a defocus amount used for reference, not for focus control.

As described above, the defocus amount for non-focus control is acquired from the peripheral region RE in addition to the defocus amount for focus control. Thereby, in a case where a specific object enters the search region RB from outside the search region RB, it is possible to predict a focusing position in a short time, and it is possible to perform focus control at higher speed.

Figure 15:
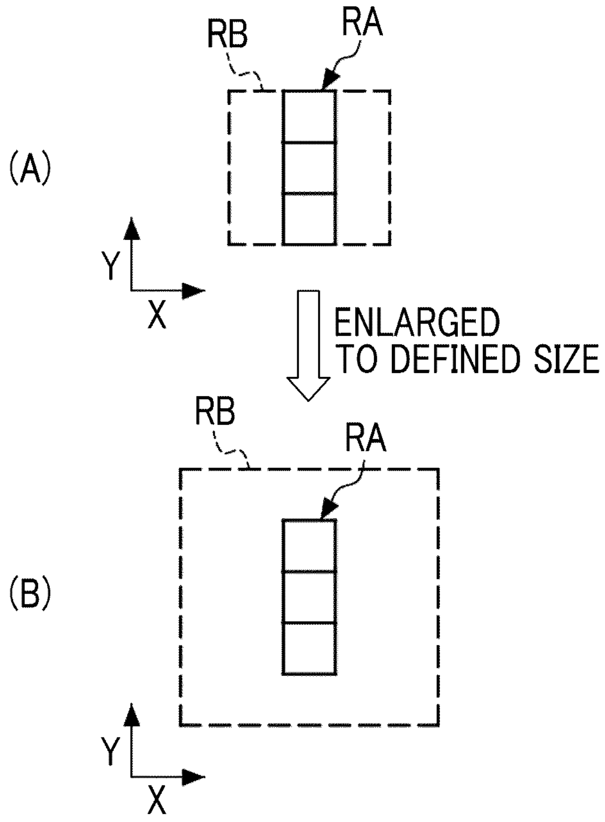
FIG. 15 is a diagram illustrating processing of limiting a size of the search region to a minimum size.

In the above-described embodiment, the search region determination unit 55 determines the search region RB based on the long side of the AF area RA. Therefore, as illustrated in (A) of FIG. 15, in a case where the AF area RA that is set is small, the search region RB becomes smaller. In a case where the search region RB is too small, the object region detection unit 56 may not be able to detect the object region RC. For this reason, the search region determination unit 55 determines the search region RB based on the long side of the AF area RA as illustrated in (B) of FIG. 15. Therefore, as illustrated in (A) of FIG. 15, in a case where the search region RB that is determined based on the AF area RA is smaller than a defined size, it is preferable to set the size of the search region RB to the defined size. (B) of FIG. 15 illustrates the search region RB that is enlarged to a defined size. For example, the defined size is a minimum image size that can be input to the trained model LM. For example, the defined size is an image size of 320 pixels×320 pixels in the X direction and the Y direction. For example, in a case where the AF area RA has a size of 200 pixels×100 pixels, the search region determination unit 55 sets the search region RB to a size of 320 pixels×320 pixels.

In addition, in a case where the size of the search region RB determined by the search region determination unit 55 is smaller than the defined size (for example, 320 pixels×320 pixels), the object region detection unit 56 may enlarge the cutout image that is cut out from the search region RB to the minimum size and input the enlarged cutout image to the trained model LM. In addition, a lower limit of the size of the cutout image to be enlarged may be defined. For example, the lower limit of the size of the cutout image to be enlarged is set to a size of 200 pixels×200 pixels.

Further, the AF area RA may be set such that the plurality of blocks are discretely located within the imaging region. In this case, the search region determination unit 55 determines the search region RB for each block. In a case where the search regions RB of the blocks are close to each other, the search region determination unit 55 may integrate a plurality of search regions RB into one search region RB.

In addition, the search region determination unit 55 may optimize the size of the search region RB by using a past detection history of the object region RC by the object region detection unit 56. Even in a state where the object region RC is detected, in a case where the size of the object OJ included in the object region RC is relatively too small with respect to the search region RB, the detection performance is deteriorated, and the detection is likely to be unstable. In addition, even in a case where the object OJ is so large that the object OJ protrudes from the search region RB, the detection performance is deteriorated, and the detection is likely to be unstable.

Figure 16:
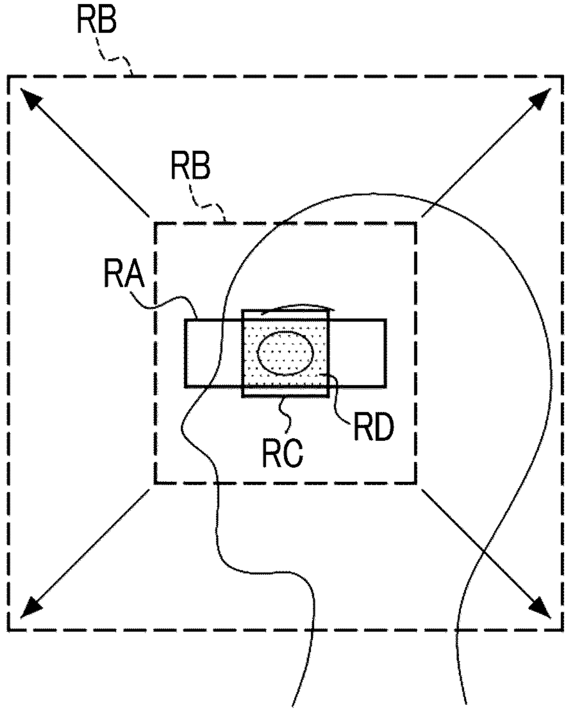
FIG. 16 is a diagram illustrating processing of enlarging the search region.

For example, as illustrated in FIG. 16, in a case where the object OJ included in the object region RC is a human pupil, a face larger than the pupil may protrude outside the search region RB, and this results in unstable detection. In this case, preferably, the search region determination unit 55 enlarges the search region RB such that the search region RB includes a face in a case of determining the search region RB next time. As described above, in a case where the detected object region RC is a specific portion, preferably, the search region determination unit 55 changes the size of the search region RB according to a type or a size of the portion.

Figure 17:
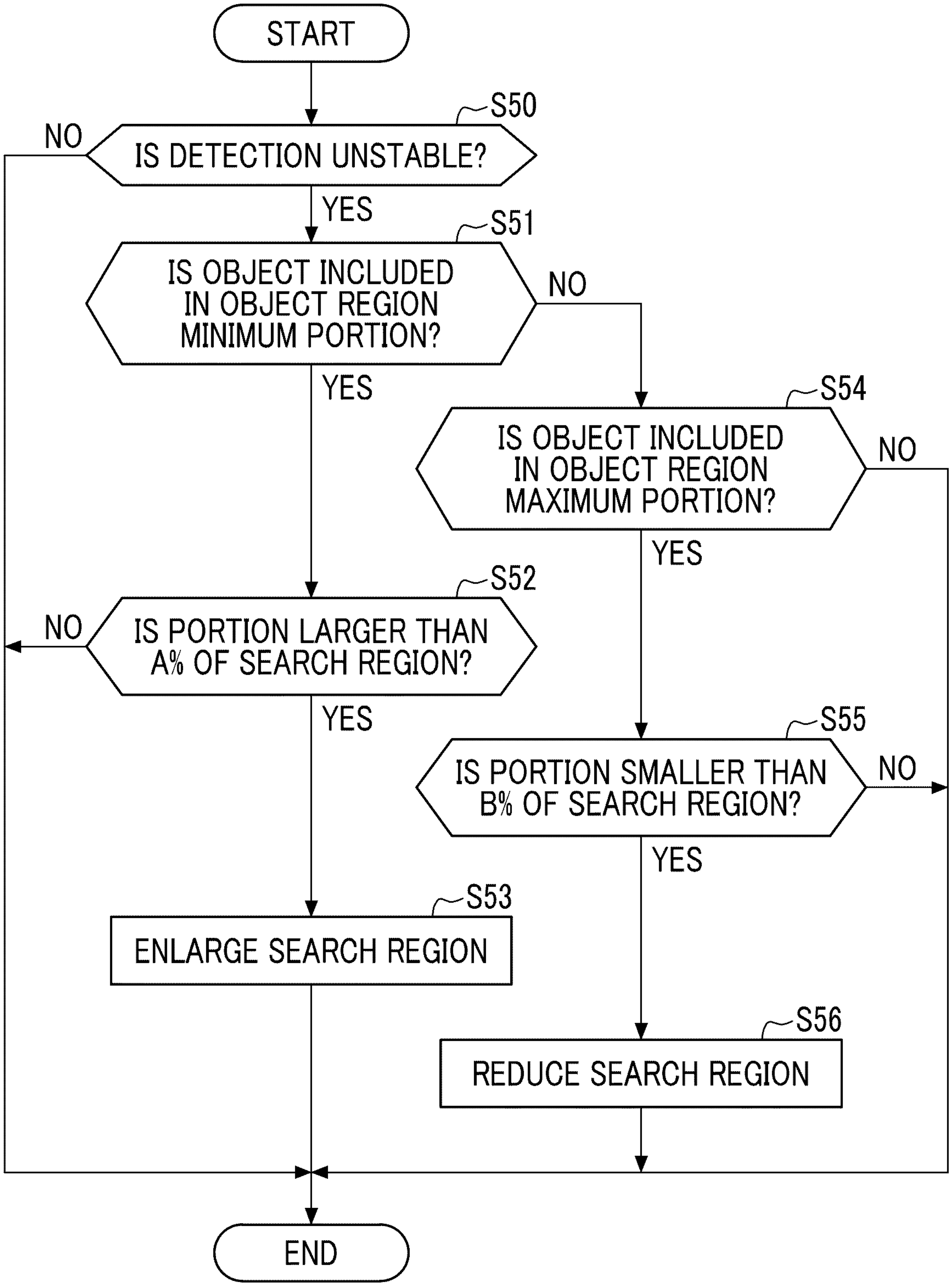
FIG. 17 is a flowchart illustrating an example of processing of optimizing the search region.

FIG. 17 illustrates an example of optimization processing of the search region RB by the search region determination unit 55. In the optimization processing, first, the search region determination unit 55 determines whether or not the detection of the object region RC by the object region detection unit 56 is unstable (step S50). For example, in a case where the object OJ is relatively too small or too large with respect to the search region RB, it is determined that the detection is unstable. The search region determination unit 55 ends the optimization processing in a case where the detection is not unstable (NO in step S50).

In a case where the detection is unstable (YES in step S50), the search region determination unit 55 determines whether or not the object OJ included in the object region RC is a minimum portion (step S51). The minimum portion is a smallest portion (for example, a human pupil) in the object OJ. In a case where the object OJ is the minimum portion (YES in step S51), the search region determination unit 55 determines whether or not the minimum portion is larger than A % of the search region RB (step S52). In a case where the minimum portion is larger than A % of the search region RB, the search region determination unit 55 enlarges the search region RB (step S53), and ends the optimization processing. In addition, in a case where the minimum portion is not larger than A % of the search region RB, the search region determination unit 55 ends the optimization processing.

In a case where the object OJ is not the minimum portion (NO in step S51), the search region determination unit 55 determines whether or not the object OJ is a maximum portion (step S54). The maximum portion is a largest portion (for example, a body of a bird) in the object OJ. In a case where the object OJ is the maximum portion (YES in step S54), the search region determination unit 55 determines whether or not the maximum portion is smaller than B % of the search region RB (step S55). In a case where the maximum portion is smaller than B % of the search region RB, the search region determination unit 55 reduces the search region RB (step S56), and ends the optimization processing. In addition, in a case where the maximum portion is not smaller than B % of the search region RB, the search region determination unit 55 ends the optimization processing.

The search region determination unit 55 determines an enlargement rate and a reduction rate of the search region RB based on a detection stability (for example, a detection success rate such as successful detection 4 times in the past 10 frames) and a history of the size of the object OJ with respect to the search region RB.

According to the optimization processing, for example, in a case where a human pupil is detected as a minimum portion and the minimum portion has a size of approximately 30% of the search region RB, a human head has a size of approximately 10 times the size of the pupil. Therefore, the search region RB is enlarged to a size that is approximately 10 times the size of the pupil.

In addition, according to the optimization processing, for example, in a case where a body of a bird is detected as a maximum portion and the maximum portion has a size of approximately 5% of the search region RB, since the size of the maximum portion is too small, the detection is not stable. Therefore, the search region RB is reduced such that the maximum portion is approximately 10% of the search region RB.

Figure 18:
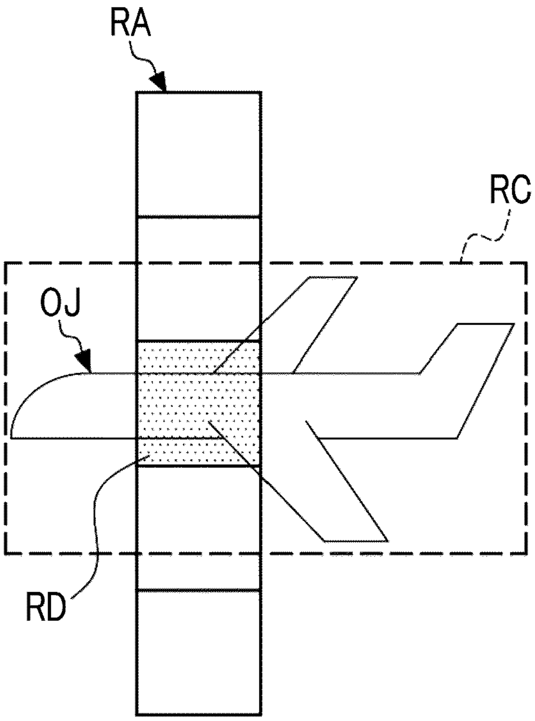
FIG. 18 is a diagram illustrating an example of an object region in a case where the object is an airplane.

In the above-described embodiment, the overlapping region detection unit 57 detects one or a plurality of blocks at which the overlap ratio is equal to or higher than the threshold value, as the overlapping region RD. The overlapping region detection unit 57 may change the threshold value according to the type of the object. For example, as illustrated in FIG. 18, in a case where the object OJ is an airplane, the object region RC includes many blank spaces in which the object OJ does not exist. Therefore, it is preferable to set the threshold value to be high. As a result, only the blocks in which the overlap ratio with the object OJ is high are detected as the overlapping region RD, and thus accuracy of focus control is improved.

Figure 19:
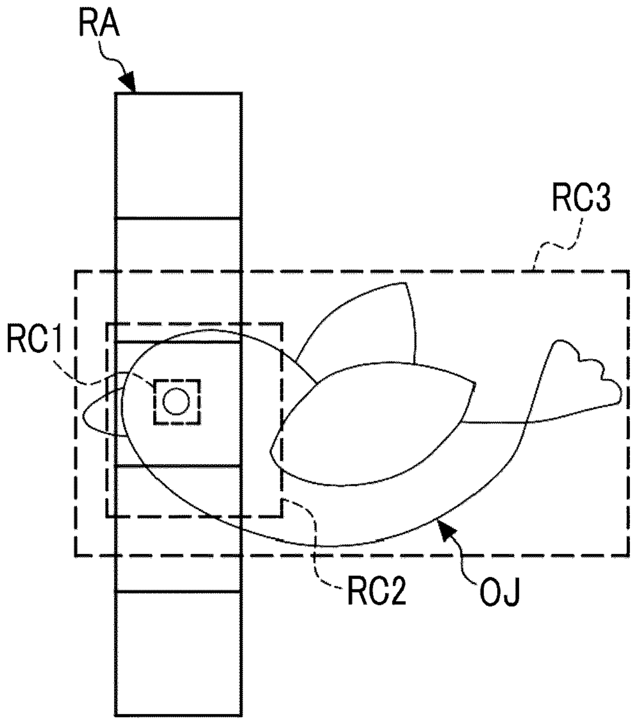
FIG. 19 is a diagram explaining an overlap ratio for a plurality of object regions.

Further, in the above-described embodiment, the ratio at which the object region RC overlaps the block is defined as the overlap ratio. On the other hand, a ratio at which the AF area RA overlaps the object region RC may be defined as the overlap ratio. For example, as illustrated in FIG. 19, in a case where a plurality of object regions RC1 to RC3 are detected by the object region detection unit 56, the overlap ratios of the object regions RC1 to RC3 are different from each other. The object region RC1 is a region including a pupil of a bird. Since the object region RC1 is completely included in the AF area RA, the overlap ratio is high. The object region RC2 is a region including a face of a bird. Since only a part of the object region RC2 overlaps the AF area RA, the overlap ratio is low. The object region RC3 is a region including a body of a bird. Since only a part of the object region RC3 overlaps the AF area RA, the overlap ratio is low.

Figure 20:
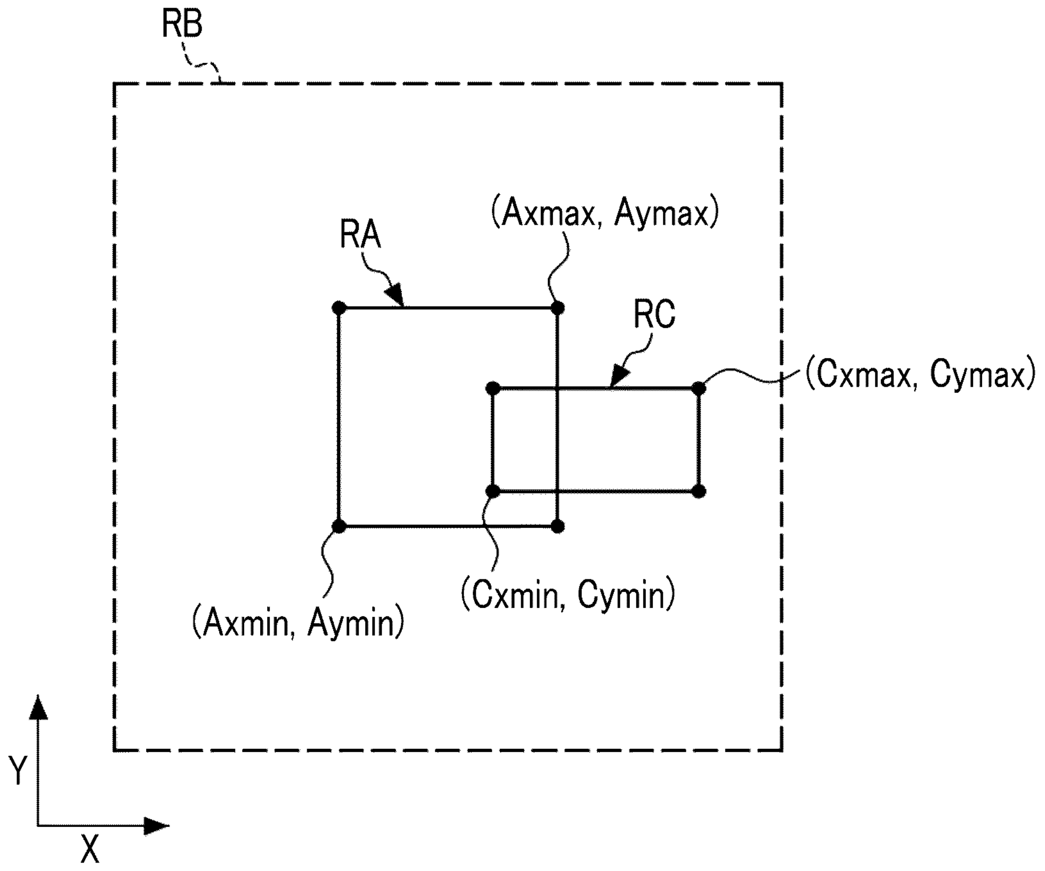
FIG. 20 is a diagram for defining coordinates of an object region and an AF area.
Figure 21:
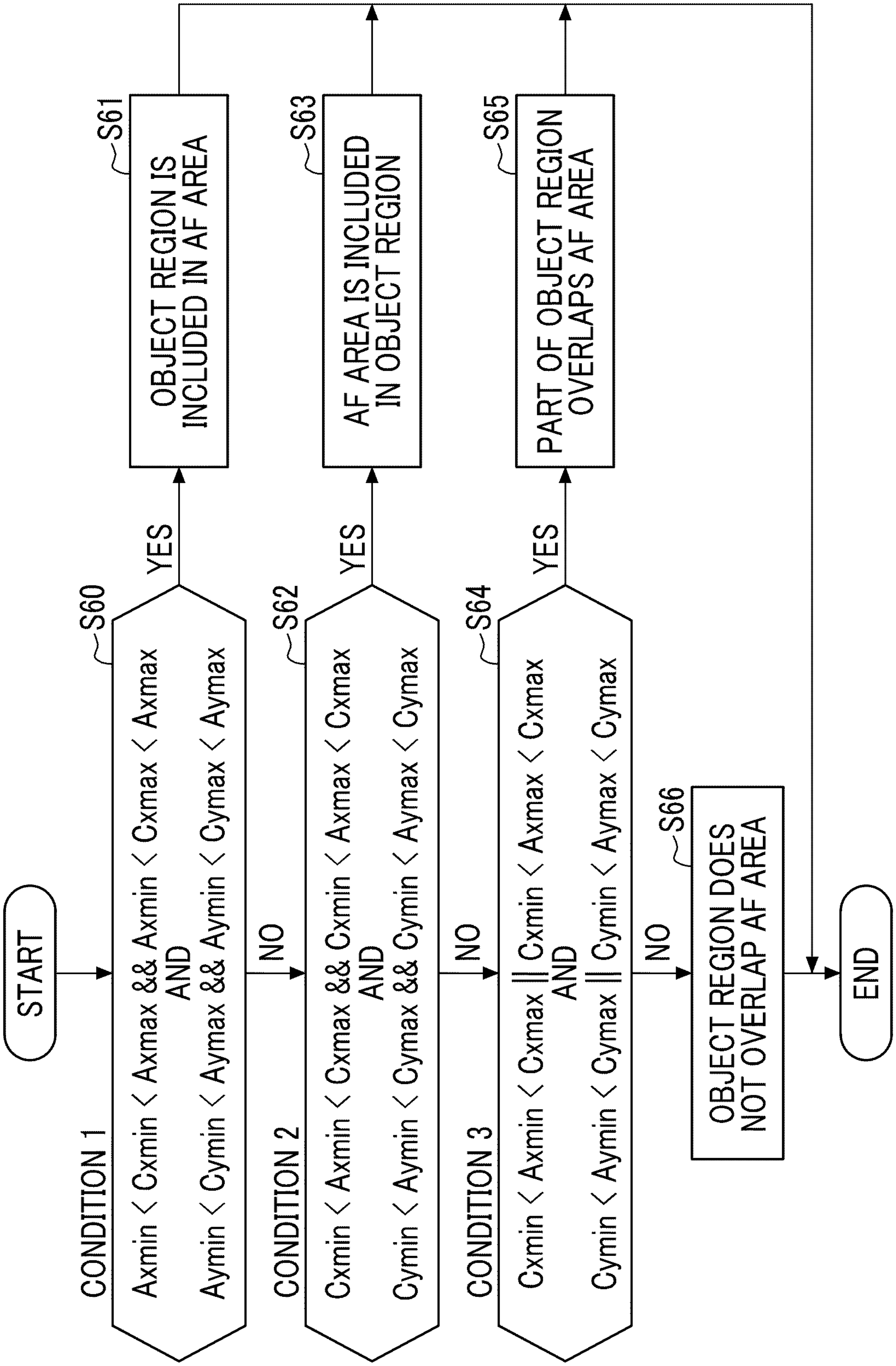
FIG. 21 is a flowchart illustrating an example of processing of determining a positional relationship between an object region and an AF area.

A positional relationship between the object region RC and the AF area RA can be obtained by setting coordinates of the object region RC and the AF area RA as illustrated in FIG. 20 and performing determination based on the flowchart of FIG. 21.

As illustrated in FIG. 20, a minimum coordinate and a maximum coordinate of the object region RC in the X direction are respectively denoted by Cxmin and Cxmax. Further, a minimum coordinate and a maximum coordinate of the object region RC in the Y direction are respectively denoted by Cymin and Cymax. Further, a minimum coordinate and a maximum coordinate of the AF area RA in the X direction are respectively denoted by Axmin and Axmax. Further, a minimum coordinate and a maximum coordinate of the AF area RA in the Y direction are respectively denoted by Aymin and Aymax.

In the flowchart illustrated in FIG. 21, first, it is determined whether or not Condition 1 is satisfied (step S60). In a case where Condition 1 is satisfied (YES in step S60), it is determined that the object region RC is included in the AF area RA (step S61). In a case where Condition 1 is not satisfied (NO in step S60), it is determined whether or not Condition 2 is satisfied (step S62). In a case where Condition 2 is satisfied (YES in step S62), it is determined that the AF area RA is included in the object region RC (step S63). In a case where Condition 2 is not satisfied (NO in step S62), it is determined whether or not Condition 3 is satisfied (step S64). In a case where Condition 3 is satisfied (YES in step S64), it is determined that a part of the object region RC overlaps the AF area RA (step S65). In a case where Condition 3 is not satisfied (NO in step S64), it is determined that the object region RC does not overlap the AF area RA (step S66).

In a case where it is determined that a part of the object region RC overlaps the AF area RA and where the object region RC includes a portion having high importance such as a pupil, preferably, the overlapping region detection unit 57 sets the threshold value to be lower. Further, even in a case where it is determined that a part of the object region RC overlaps the AF area RA and where the object region RC includes the entire object such as a body, preferably, the overlapping region detection unit 57 sets the threshold value to be lower.

Further, in the above-described embodiment, the display controller 53 causes the display 15 to display the image. On the other hand, instead of the display 15 or together with the display 15, the display controller 53 may cause the finder 14 to display the image. In this case, the focus control device may be configured to allow the user to designate the AF area RA via a visual line input device. The finder 14 is an example of a "display device" according to the technology of the present disclosure. The visual line input device is an example of an "operating device" according to the technique of the present disclosure.

The technology of the present disclosure is not limited to the digital camera and can also be applied to electronic devices such as a smartphone and a tablet terminal having an imaging function.

In the above-described embodiment, various processors to be described below can be used as the hardware structure of the controller using the processor 40 as an example. The above-described various processors include not only a CPU which is a general-purpose processor that functions by executing software (programs) but also a processor that has a changeable circuit configuration after manufacturing, such as an FPGA. The FPGA includes a dedicated electrical circuit that is a processor which has a dedicated circuit configuration designed to execute specific processing, such as PLD or ASIC, and the like.

The controller may be configured by one of these various processors or a combination of two or more of the processors of the same type or different types (for example, a combination of a plurality of FPGAs or a combination of a CPU and an FPGA). Alternatively, a plurality of controllers may be configured with one processor.

A plurality of examples in which a plurality of controllers are configured as one processor can be considered. As a first example, there is an aspect in which one or more CPUs and software are combined to configure one processor and the processor functions as a plurality of controllers, as represented by a computer such as a client and a server. As a second example, there is an aspect in which a processor that implements the functions of the entire system, which includes a plurality of controllers, with one IC chip is used, as represented by system on chip (SOC). In this way, the controller can be configured by using one or more of the above-described various processors as the hardware structure.

Furthermore, more specifically, it is possible to use an electrical circuit in which circuit elements such as semiconductor elements are combined, as the hardware structure of these various processors.

In addition, the program may be stored in a non-transitory computer readable storage medium.

The described contents and the illustrated contents are detailed explanations of a part according to the technique of the present disclosure, and are merely examples of the technique of the present disclosure. For example, the descriptions related to the configuration, the function, the operation, and the effect are descriptions related to examples of a configuration, a function, an operation, and an effect of a part according to the technique of the present disclosure. Therefore, it goes without saying that, in the described contents and illustrated contents, unnecessary parts may be deleted, new components may be added, or replacements may be made without departing from the spirit of the technique of the present disclosure. Further, in order to avoid complications and facilitate understanding of the part according to the technique of the present disclosure, in the described contents and illustrated contents, descriptions of technical knowledge and the like that do not require particular explanations to enable implementation of the technique of the present disclosure are omitted.

All documents, patent applications, and technical standards described in this specification are incorporated herein by reference to the same extent as in a case where each document, each patent application, and each technical standard are specifically and individually described by being incorporated by reference.

The following technique can be understood by the above description.

Appendix 1

A focus control device including:

a processor; and a memory, in which the processor is configured to:

- acquire an image signal output from an imaging element;
- set a focusing target region in an imaging region based on output information from an operating device that receives an operation by a user;
- determine a search region based on the focusing target region;
- detect an object region including a specific object from the search region;
- detect an overlapping region in which the focusing target region and the object region overlap each other; and
- perform focus control based on the image signal of the overlapping region.

Appendix 2

The focus control device according to Appendix 1, in which the focusing target region includes a plurality of blocks, and the processor is configured to detect one or a plurality of blocks that overlap the object region among the plurality of blocks, as the overlapping region.

Appendix 3

The focus control device according to Appendix 1, in which the processor is configured to detect one or a plurality of blocks at which an overlap ratio with the object region is equal to or higher than a threshold value among the plurality of blocks, as the overlapping region.

Appendix 4

The focus control device according to Appendix 3, in which the processor is configured to change the threshold value according to a type of the specific object.

Appendix 5

The focus control device according to Appendix 1, in which the processor is configured to detect a region in which an overlap ratio of the focusing target region and the object region is equal to or higher than a threshold value, as the overlapping region.

Appendix 6

The focus control device according to Appendix 5, in which the processor is configured to, in a case where the overlap ratio is lower than the threshold value, perform focus control based on the image signal of the focusing target region.

Appendix 7

The focus control device according to any one of Appendixes 1 to 6, in which the processor is configured to determine the search region based on a long side of the focusing target region.

Appendix 8

The focus control device according to Appendix 7, in which the focusing target region has a rectangular shape.

Appendix 9

The focus control device according to any one of Appendixes 2 to 4, in which the processor is configured to, in a case where the focusing target region includes a plurality of blocks, divide the focusing target region into the number of blocks according to a type of the specific object.

Appendix 10

The focus control device according to any one of Appendixes 1 to 9, in which the processor acquires a defocus amount for a non-focus control based on the image signal of a region that is outside the overlapping region and is inside the search region.

Appendix 11

The focus control device according to any one of Appendixes 1 to 10, in which the processor is configured to highlight and display the overlapping region on a display device by changing a color of a frame of the overlapping region, a shape of the frame, or a line type of the frame.

Appendix 12

The focus control device according to any one of Appendixes 1 to 11, in which the processor is configured to detect the object region by inputting the image signal of the search region into a machine-trained model.

Appendix 13

The focus control device according to any one of Appendixes 1 to 12, in which the processor is configured to, in a case where the search region determined based on the focusing target region is smaller than a defined size, set a size of the search region to the defined size.

Appendix 14

The focus control device according to any one of Appendixes 1 to 13, in which the processor is configured to, in a case where the detected object region is a specific portion, change a size of the search region according to a type or a size of the portion.

Appendix 15

An imaging apparatus including:

the focus control device according to any one of Appendixes 1 to 14;

the imaging element; and the operating device.

What is claimed is:

1. A focus control device comprising:

a processor; and a memory, wherein the processor is configured to:

acquire an image signal output from an imaging element;

set a focusing target region in an imaging region based on output information from an operating device that receives an operation by a user;

determine a search region based on the focusing target region;

detect an object region including a specific object from the search region;

detect an overlapping region, defined as an intersection of the focusing target region and the object region, in which the focusing target region and the object region overlap each other; and perform focus control based on the image signal of the detected overlapping region.

2. The focus control device according to claim 1, wherein the focusing target region includes a plurality of blocks, and the processor is configured to detect one or a plurality of blocks that overlap the object region among the plurality of blocks, as the overlapping region.

3. The focus control device according to claim 2, wherein the processor is configured to detect one or a plurality of blocks at which an overlap ratio with the object region is equal to or higher than a threshold value among the plurality of blocks, as the overlapping region.

4. The focus control device according to claim 3, wherein the processor is configured to change the threshold value according to a type of the specific object.

5. The focus control device according to claim 2, wherein the processor is configured to, in a case where the focusing target region does not include a plurality of blocks, divide the focusing target region into the number of blocks according to a type of the specific object.

6. The focus control device according to claim 1, wherein the processor is configured to detect a region in which an overlap ratio of the focusing target region and the object region is equal to or higher than a threshold value, as the overlapping region.

7. The focus control device according to claim 6, wherein the processor is configured to, in a case where the overlap ratio is lower than the threshold value, perform focus control based on the image signal of the focusing target region.

8. The focus control device according to claim 1, wherein the processor is configured to determine the search region based on a long side of the focusing target region.

9. The focus control device according to claim 8, wherein the focusing target region has a rectangular shape.

10. The focus control device according to claim 1, wherein the processor is configured to acquire a defocus amount for non-focus control based on the image signal of a region that is outside the overlapping region and is inside the search region.

11. The focus control device according to claim 1, wherein the processor is configured to highlight and display the overlapping region on a display device by changing a color of a frame of the overlapping region, a shape of the frame, or a line type of the frame.

12. The focus control device according to claim 1, wherein the processor is configured to detect the object region by inputting the image signal of the search region into a machine-trained model.

13. The focus control device according to claim 1, wherein the processor is configured to, in a case where the search region determined based on the focusing target region is smaller than a defined size, set a size of the search region to the defined size.

14. The focus control device according to claim 1, wherein the processor is configured to, in a case where the detected object region is a specific portion, change a size of the search region according to a type or a size of the portion.

15. An imaging apparatus comprising:
the focus control device according to claim 1;
the imaging element; and
the operating device.

16. The focus control device according to claim 1, wherein the processor is configured to perform the focus control based on the image signal of the detected overlapping region, and such that an image signal of a portion of the object region outside the detected overlapping region is not used for the focus control.

17. A focus control method performed by a processor, the method comprising:
acquiring an image signal output from an imaging element;
setting a focusing target region in an imaging region based on output information from an operating device that receives an operation by a user;
determining a search region based on the focusing target region;
detecting an object region including a specific object from the search region;
detecting an overlapping region, defined as an intersection of the focusing target region and the object region, in which the focusing target region and the object region overlap each other; and
performing focus control based on the image signal of the detected overlapping region.

18. A non-transitory computer-readable storage medium storing a program causing a processor to execute a process comprising:
acquiring an image signal output from an imaging element;
setting a focusing target region in an imaging region based on output information from an operating device that receives an operation by a user;
determining a search region based on the focusing target region;
detecting an object region including a specific object from the search region;
detecting an overlapping region, defined as an intersection of the focusing target region and the object region, in which the focusing target region and the object region overlap each other; and
performing focus control based on the image signal of the detected overlapping region.

* * * * *